(12) United States Patent
Seliuchenko et al.

(10) Patent No.: US 10,969,651 B2
(45) Date of Patent: Apr. 6, 2021

(54) LIGHT DETECTION AND RANGING SYSTEM

(71) Applicant: Melexis Technologies NV, Tessenderlo (BE)

(72) Inventors: Volodymyr Seliuchenko, Nashua, NH (US); Marcelo Mizuki, Nashua, NH (US)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 382 days.

(21) Appl. No.: 15/876,544

(22) Filed: Jan. 22, 2018

(65) Prior Publication Data

US 2018/0210086 A1      Jul. 26, 2018

(30) Foreign Application Priority Data

Jan. 25, 2017    (EP) .................................... 17153023

(51) Int. Cl.
| | | |
|---|---|---|
| *G01S 7/00* | (2006.01) | |
| *G02F 2/00* | (2006.01) | |
| *G01S 7/497* | (2006.01) | |
| *G01S 7/4863* | (2020.01) | |
| *G01S 17/42* | (2006.01) | |
| *G01S 7/487* | (2006.01) | |
| *G01S 17/10* | (2020.01) | |

(52) U.S. Cl.
CPC ............ *G02F 2/002* (2013.01); *G01S 7/4863* (2013.01); *G01S 7/4876* (2013.01); *G01S 7/497* (2013.01); *G01S 17/10* (2013.01); *G01S 17/42* (2013.01)

(58) Field of Classification Search
USPC ........................................................ 356/4.01
See application file for complete search history.

(56) References Cited

U.S. PATENT DOCUMENTS 5,260,584 A * 11/1993 Popson ................ G01N 21/474
                                                    250/205
5,891,038 A *  4/1999 Seyed-Bolorforosh ......................
                                                 G01S 7/52028
                                                    600/447

(Continued)

FOREIGN PATENT DOCUMENTS

DE      102015204125 A1      9/2016
WO      2015136100 A2        9/2015

OTHER PUBLICATIONS

Extended European Search Report from EP Application No. EP 17153023.1, dated Jul. 3, 2017.

*Primary Examiner* — James R Hulka
(74) *Attorney, Agent, or Firm* — Workman Nydegger

(57) ABSTRACT

A multi-channel light detection and ranging system includes a plurality of active channels, each comprising a photosensitive element arranged to be exposed to light and an analog front end circuit arranged for receiving a signal from the photosensitive element. A compensation channel comprises a compensation element and an analog front end circuit arranged for receiving signals from the compensation capacitor. A processing unit arranged for receiving signals from the active channels and the compensation channel, deriving at a compensation signal from the signal received from the compensation channel, and compensating for the crosstalk interference and/or the interference common to the analog front end circuits of the active channels, using the compensation signal.

14 Claims, 3 Drawing Sheets

(56) References Cited

U.S. PATENT DOCUMENTS

| | | | |
|---|---|---|---|
| 6,927,889 B2 | 8/2005 | Schwarte | |
| 7,301,142 B2 * | 11/2007 | Shichi | G01D 5/36 250/231.13 |
| 9,948,880 B2 * | 4/2018 | Lund | H04N 5/3454 |
| 2004/0012834 A1 * | 1/2004 | Schwarte | H03D 9/0608 359/237 |
| 2005/0095012 A1 * | 5/2005 | Watanabe | H04B 10/25133 398/199 |
| 2006/0002634 A1 * | 1/2006 | Riley | G01J 3/28 382/294 |
| 2006/0266931 A1 * | 11/2006 | Shichi | H03M 1/301 250/214 R |
| 2013/0283916 A1 * | 10/2013 | Hersey | G01N 29/11 73/587 |
| 2018/0041727 A1 * | 2/2018 | Lund | H04N 5/378 |

\* cited by examiner

LIGHT DETECTION AND RANGING SYSTEM

FIELD OF THE INVENTION

The present invention is generally related to the field of light detection and ranging systems, more in particular to light detection and ranging systems containing a plurality of channels.

BACKGROUND OF THE INVENTION

LIDAR (derived from 'light radar') systems are well known in the art. The term LIDAR system is used as an acronym of light detection and ranging system. Such systems are designed to perform a distance measurement to a target object by directing an incident light beam to that target and detecting the reflected light beam. The distance to the target may be calculated based on a time of flight measurement of the incident light beam and the reflected light beam. LIDAR systems can be used in a variety of adaptive driver assistance (ADAS) applications like emergency breaking, adaptive cruise control, blind spot monitoring; LIDAR system can be one of the key sensing components in autonomous driving systems to aid vehicle navigation. It is to be noted, however, that also applications like distance measurement instrumentation, 3D mapping, virtual reality, augmented reality, robotics, automation, security surveillance make use of LIDAR systems.

LIDAR can in principal use any light wavelength, for example ultraviolet, visible, near-infrared or infrared light to image objects. The wavelengths used vary depending on the application specifications and the availability of (low-cost) optical components like light sources and photodetectors. The sensor records the light amplitude beginning from the time when the pulse is emitted and the amplitude versus time signal is used to find the reflected pulse shapes located in the scene.

LIDAR systems with a multitude of parallel light detection channels have been proposed. The signals from the photodiodes are received in an analog front end block where they are converted into signals which can be processed for eventually determining the distance to the target object. A typical example of the analog front end block is a transimpedance amplifier converting photodiode electrical current signal into a voltage signal.

FIG. 1 shows a LIDAR system 100 comprising an array of photodiodes 102 and a block 101 wherein signals received from the array of photodiodes are received and processed. An illumination source 107 emits light pulses or modulated light into the scene that in the example of FIG. 1 comprises a high reflective object 104 and a low reflective object 106. In the shown example the scene is projected on the photosensitive elements 102 in the LIDAR system via a lens 103. The received signals are then converted and processed in block 101. This typically comprises an amplification, analog-to-digital conversion, low-pass filtering and pulse detection (e.g. by applying curve fitting or correlation). Eventually the distance is determined by multiplying half the round trip time with the speed of light.

In such a multi-channel LIDAR system with arrayed detection diodes there can be significant crosstalk interference from one channel (aggressor) to another (victim). A common problem in semiconductor photodiode arrays is crosstalk where inductive, resistive or capacitive coupling leads to interference pulses on the victim channels. For example, the interference pulse may be of a derivative shape. As will be explained more in detail later in the description, further crosstalk can be introduced by the analog front-end present which is a part of block 101 in FIG. 1.

Due to interference that has occurred ghost objects 105 (FIG. 1) may be observed from the signals reflected from objects 104 and 106. This interference leads to increased probability of false detections or missed detections compromising accurate rendering of the scene and constituting a serious problem for safety critical applications.

Prior attempts to solve the crosstalk problems have relied on an algorithmic approach of taking the derivatives or first-differences of samples digitally. Although it may be possible to compensate for simple idealized interference patterns, this approach cannot easily resolve complicated non-linear or random interference cases when, for example, pulses from multiple different objects within the channel's field of view merge, forming an arbitrarily shaped reflection signal. Attempting to solve these problems algorithmically can lead to extreme complexity which may not successfully track changing process, voltage and temperature (PVT) conditions.

Differential signal chain architectures have been investigated also, but their feasibility is often restricted to fully isolated diodes and is complicated by the fact that diodes often use a much higher bias voltage than what is allowed in standard mixed-signal CMOS processes.

Hence, there is a need for dealing with crosstalk in a multi-channel LIDAR system.

SUMMARY OF THE INVENTION

It is an object of embodiments of the present invention to provide for a multi-channel light detection and ranging system capable of compensating crosstalk occurring between active channels.

The above objective is accomplished by the solution according to the present invention.

In a first aspect the invention relates to a multi-channel light detection and ranging system comprising a plurality of active channels, each comprising a photosensitive element arranged to be exposed to light and an analog front end circuit arranged for receiving a signal from the photosensitive element, whereby at least one of the active channels is susceptible of being affected by crosstalk interference caused by at least one other active channel and/or by interference common to the analog front end circuits, at least one compensation channel comprising a compensation element and an analog front end circuit arranged for receiving signals from the compensation element, said compensation element being electrically connected by means of a first terminal to a network shared by the photosensitive elements and connected by means of a second terminal with the analog front end circuit of the at least one compensation channel, a processing unit arranged for
 receiving signals from the active channels and the at least one compensation channel,
 deriving at least one compensation signal from the signal received from the at least one compensation channel,
 compensating for the crosstalk interference and/or the interference common to the analog front end circuits of the active channels, using the at least one compensation signal.

The proposed solution indeed allows for compensating the crosstalk. By providing in one or more compensation channels a compensation element, it is possible to obtain in the processing unit a compensation signal derived from the signal(s) in the channel(s) containing a compensation element. This signal contains an indication of the amount of crosstalk interference and/or interference common to the analog front end circuits. In a preferred embodiment the compensation element is implemented as a blinded photodiode, i.e. a photodiode insensitive to light. The compensation channel with the blinded diode is affected by interference in the same way as the active channels while receiving no signal from light, thus the compensation channel signal serves as a good estimate of the crosstalk magnitude in the multichannel LIDAR system. In another preferred embodiment the compensation element is implemented as a capacitor. The capacitance of the compensation capacitor is then typically tuned to match the capacitance of the photodiode. However, higher or lower capacitance values may also be used.

The step of compensating can be performed in various ways. In a preferred embodiment the compensation comprises subtracting the at least one compensation signal from the signals received from the active channels.

In an embodiment two or more compensation elements are provided, each in a different compensation channel.

Another preferred way to carry out the compensation involves the use of gradient compensation, wherein the crosstalk compensation is based on a weighted sum of signals of the two or more compensation elements. Advantageously, the compensation per channel takes into account the physical location of the compensation channel(s) with respect to the active channel(s).

In order to achieve a better compensation effectiveness, some pulse shaping is advantageously performed on the signals received from the active channels and compensation channels. In certain embodiments this is achieved by performing a scaling and/or applying the signals to a filter to obtain a better bandwidth match between the active and compensation channels. In general, any pulse shaping non-linear or linear function can be used.

In another embodiment the photosensitive elements in said plurality of active channels have a terminal in common, e.g. the cathode.

In a preferred embodiment the processing unit is on a same substrate as the photosensitive elements and the analog front end circuits of said plurality of active channels.

In one embodiment the photosensitive elements of the plurality of active channels are on a different substrate than the analog front end block and the processing unit.

In one embodiment the photosensitive elements of said active channels are on a different substrate than the compensation element of the at least one compensation channel.

Advantageously, the processing unit is arranged for detecting a signal chain failure by observing a signal obtained after crosstalk interference compensation.

In one embodiment the processing unit is arranged for deriving a detection threshold from performance statistics of the at least one compensation channel.

In another embodiment the multi-channel light detection and ranging system is further arranged for generating at a given time an interference signal, common to said analog front end circuits, and the processing unit is arranged for detecting a signal chain failure by observing at said given time a signal obtained after crosstalk interference compensation.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
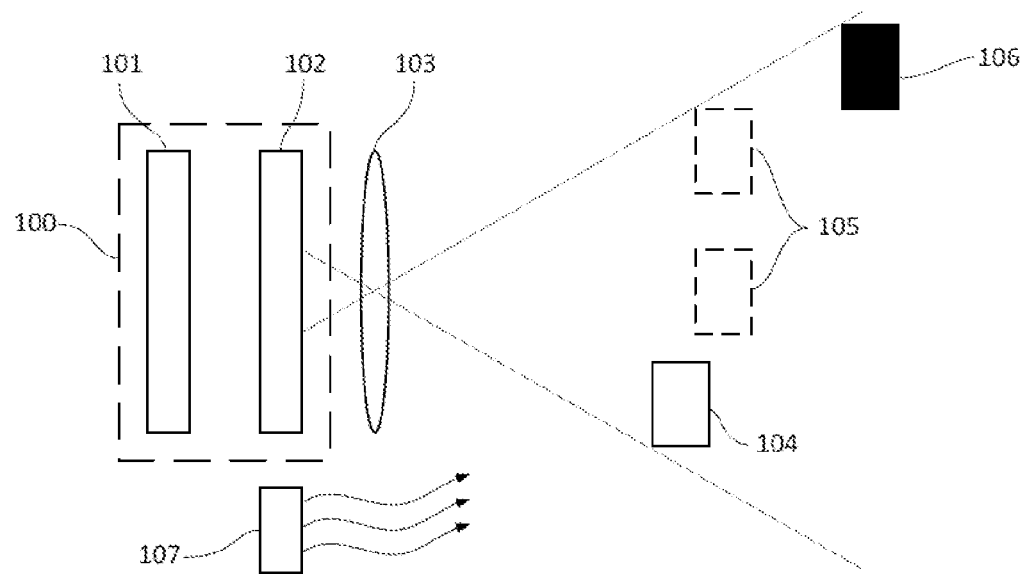
FIG. 1 illustrates a typical LIDAR system composition.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention aims to propose a multi-channel LIDAR system adapted for compensating crosstalk. In the proposed system infrared LEDs or lasers are arranged to emit pulsed light at wavelengths, for example in the range above 900 nm, and the reflected pulses are used to compute the distance using photosensitive elements, an analog signal chain and signal processing algorithms. The sensor records the light amplitude beginning from the time when the pulse is emitted and the amplitude versus time signal is used to find the reflected pulse shapes located in the scene. The distance is then determined by multiplying half the round trip time with the speed of light.

Figure 2:
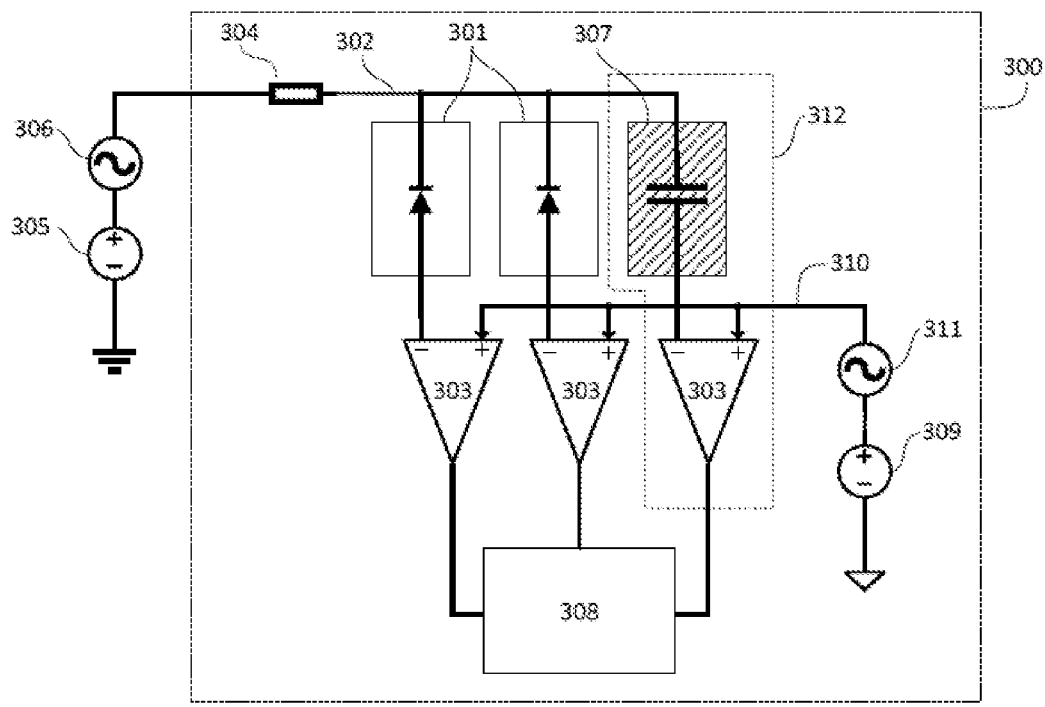
FIG. 2 illustrates an embodiment of the LIDAR system according to the invention.

A high-level block scheme of an embodiment of a LIDAR system according to the present invention is shown in FIG. 2. A linear array comprising a plurality of active channels is shown. Each active channel comprises a photosensitive element 301. The photosensitive element can for example be a conventional photodiode, a PIN photodiode, an avalanche photodiode, a photoresistor or any other element capable of converting light into an electrical signal. The various photosensitive elements share a network 302. An active channel further comprises an analog front end circuit that receives a signal from the photosensitive element in the channel. The function of the channels is to convert the light pulses which are reflected back from the objects in front of the array into electrical signals suitable for further processing. A typical number of photosensitive elements (channels) in the array may in certain applications be 16. As can be seen in the embodiment shown in FIG. 2, the various photosensitive elements may have one terminal, e.g. their cathode, in common.

As already briefly mentioned in the background section, crosstalk interference can arise in various ways in a multi-channel LIDAR system like the one shown in FIG. 2. Crosstalk can occur as an electrical signal fluctuation represented as signals 306 or 311 (FIG. 2). This fluctuation can be seen on network 302 or 310, respectively. Such signals can add up to the real signal and may be misinterpreted as a ghost image. These fluctuations can be caused by practical circuit non-idealities, for example a finite impedance of the photosensitive element bias (e.g. due to parasitic inductance of the wires, bond wires or PCB tracks, or due to parasitic resistance of the common semiconductor region serving as anode or cathode of the photodetectors, or due to non-idealities of the filtering capacitors). Another cause of electrical signal fluctuations can be electro-magnetic interference by radiation, by ground bounce, by substrate crosstalk coming from the digital blocks, the high power analog blocks or output drivers or by a voltage ripple of the photosensitive element bias.

Figure 3:
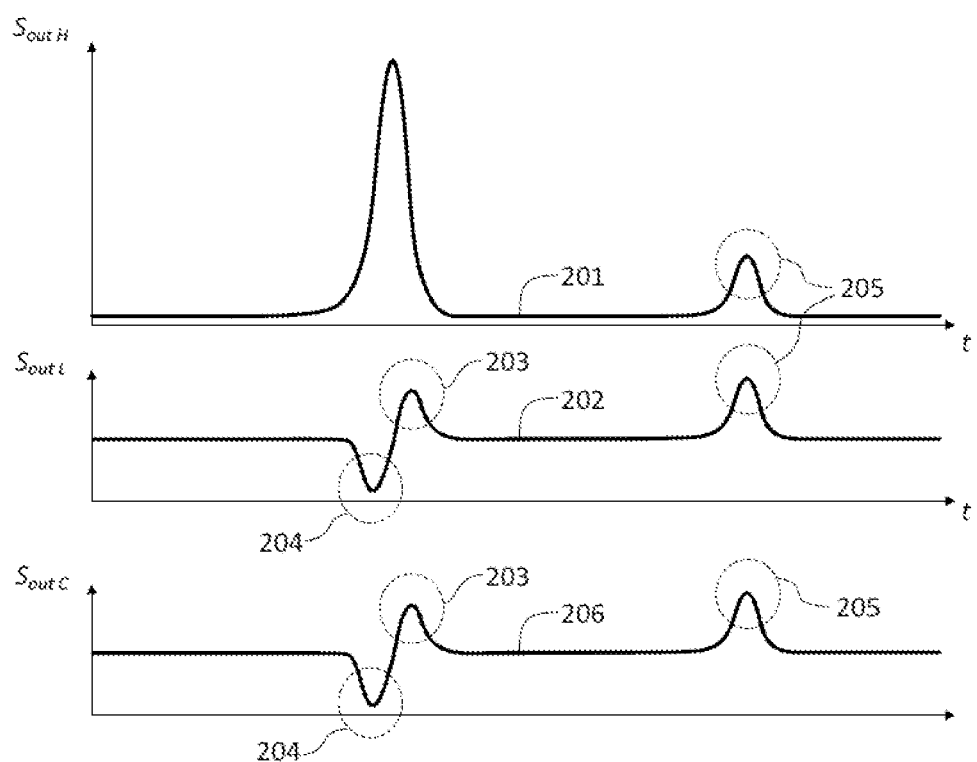
FIG. 3 illustrates acquired reflected LIDAR signals and crosstalk artefacts.

In a first example of crosstalk that can occur in the scheme of FIG. 2 a finite resistance of the common cathode network 302 creates a dependency (306) of the network voltage on the photocurrent leading to a derivative-like active channel artefacts 204 (undershoot) and 203 (overshoot) in FIG. 3. Overshoot is a risk for false detection, whereas undershoot is a risk for a missed detection.

In a second example electro-magnetic interference (EMI) on PCB level can create a common mode interference 311 which may lead to a false pulse 205 appearing in the active channels (FIG. 3). Such EMI induced common mode interference is a risk for a false detection.

As already mentioned, in operation a scene is illuminated with an illuminating unit 107. This illumination unit can provide flood illumination covering the whole scene. Alternatively it can be a scanning beam containing a rotating platform, a series of illumination units flashing one by one in a specific direction, a set of moving mirrors and/or phase arrays. The wavelengths used are typically NIR (near-IR), but can also be in any other range of the spectrum.

The active channels comprise, connected via a terminal of the photosensitive element, an analog front end circuit containing an analog signal chain to convert/amplify the light signals. The analog front end function may comprise amplification, background light subtraction, current-to-voltage conversion. The analog front end block comprises one or more amplifiers (e.g. transimpedance amplifier and/or variable gain amplifier). In a preferred embodiment the analog front end circuit is implemented as a transimpedance amplifier. Optionally, multiplexing means can be provided so that a number of photosensitive elements can share an analog front-end circuit.

In an ideal situation it would be possible to determine in the processing unit 308 the distances to objects 104 and 106 in FIG. 2 with the system as described so far. However, in practice one is faced with the problem of crosstalk interference as set out above. Hence, some essential components are still needed in the system.

In order to be able to compensate for crosstalk, it is proposed in the present invention to have at least one compensation channel comprising a compensation element 307 and an analog front end circuit receiving a signal from the compensation element. The compensation element is via one of its terminals electrically connected to the already mentioned network (302) shared by the photosensitive elements and via the other terminal connected with the analog front end circuit of the compensation channel.

In an advantageous embodiment the compensation element is implemented as a blinded photosensitive elements (e.g. a photodiode), i.e. a photosensitive element which receives no or very little light from the scene. The compensation element may be positioned at an extremity of the array of photosensitive elements. The compensation channel with a blinded photodiode is affected by interference in the same way as the active channels while receiving no signal from light, thus the compensation channel signal serves as a good estimate of the crosstalk magnitude in the multichannel LIDAR system. In another preferred embodiment the compensation element is implemented as a capacitor. Typically, the capacitance of the compensation capacitor is tuned to match the capacitance of the photodiode, however, higher or lower capacitance values may also be used.

The obtained signals are then applied to a signal processing unit that is arranged to deal with the interference and to extract the desired ranging information.

To compensate for the interference at least one compensation signal is derived from the signal(s) received from the compensation channel(s). In one embodiment the compensation is performed after the signals have undergone an analog-to-digital conversion.

A variety of algorithms can be envisaged for use in the crosstalk compensation procedure. One solution exists in simply subtracting the compensation signal from the signals received from the active channels. In another embodiment the compensation signal is first scaled before it is subtracted.

$$CH_{active}[i]=CH_{active}[i]-k_i \cdot CH_{comp} \quad (1)$$

Different scaling coefficients may be used for compensating different active channels.

In a more advanced crosstalk compensation algorithm a pulse shaping function can be applied for the compensation signal to account for possible practical mismatches between the compensation channel and the active channels (e.g. bandwidth mismatch, slew rate mismatch, etc). The compensation can then be expressed as $$CH_{active}[i]=CH_{active}[i]-f_i(CH_{comp}) \quad (2)$$

where $f_i$ is a pulse shaping function of the compensation channel signal to match active channel $CH_{active}[i]$. For example, the pulse shaping function can be a first order filter with an adjustable bandwidth dependent on the channel. Any other linear or non-linear pulse shaping functions are also possible. Optionally, another pulse shaping function can be applied to the active channel signals before subtraction.

Another option can be the use of gradient compensation. This is based on the idea that compensation channels which are closer to the active channel being compensated should have more weight than other channels. Mathematically, this is in the most general case expressed as:

$$CH_{active}[i]=CH_{active}[i]-f(CH_{comp1},CH_{comp2},\ldots,i) \quad (3)$$

By way of example, consider a case where two compensation channels $CH_{comp1}$ and $CH_{comp2}$ are present, one at either side of the array of photosensitive elements. The compensation can then be applied according to the following formula:

$$CH_{active}[i] = CH_{active}[i] - \left(\frac{i}{N} \cdot CH_{comp1} + \left(1 - \frac{i}{N}\right) \cdot CH_{comp2}\right) \quad (4)$$

whereby N denotes the number of active channels. Obviously, this is merely an example and other locations of the compensation channel and other compensation formulas or algorithms are readily available.

It is repeated that the above-mentioned compensation algorithms are merely examples and that the skilled person can readily find other algorithms to compensate the crosstalk interference with.

Compensation parameters, e.g. scaling coefficients in equation (1), can be calculated during the LIDAR system production calibration. Optionally, the compensation parameters can be computed during the operation e.g. by injecting a common mode disturbance 311 in a time frame when the light emitter is not active and minimizing the root mean square value of the functions defined by equation (1) using any function minimization methods, e.g. gradient descent.

In one embodiment the compensation can be made before the received signals have been A/D converted, hence in the analog domain where, for example, the scaling and subtraction operations in equation (1) are implemented using well known in the art analog circuit design techniques using e.g. operational amplifiers.

After the interference compensation has occurred, the resulting signals are typically applied to a low-pass filter. Next a pulse detection is performed, for example based on a curve fitting algorithm or on a correlation.

Concerning the implementation many options are possible. In one embodiment the photosensitive elements and the analog front-end circuits are on a same chip and a same substrate. However, in another embodiment they can be on the same chip but on another substrate. If optical elements are part of the system (see e.g. FIG. 1) they can be on the same chip in certain embodiments. Possibly also an illumination unit with optional beam scanning features can also be integrated on the same chip.

Further the compensation element(s) may in certain embodiments be located on the same substrate as the photosensitive elements. Alternatively, they may be integrated with the processing unit.

The presence of one or more compensation channels in the proposed solution also offers opportunities with respect to system diagnostics. In this way functional safety requirements can be monitored. To be more precise, in prior art solutions there is no diagnostic data for the processing unit to decide whether a captured data is reliable enough, both in terms of detected objects and at times when there are no objects for the system to detect. In case one of the channels fails, the failure may be undetected leading to missed detections, which may be a serious problem for safety critical applications.

The compensation channel can be used to diagnose whether the analog signal chain is operating correctly and is connected to a valid photosensitive element (e.g. PIN diode) load. For example, an artificial interference signal, common to the analog front end blocks, can be created on purpose during the time the light emitter is inactive—every active and compensation channel signal should contain the interference pulse 205. The signal obtained after applying the compensation algorithm, defined by equations 1 to 4, should be approximately zero. Signal chain failures can be detected by observing excessive deviations from zero of said signal, defined by equations 1 to 4. Alternatively, this common artificial interference signal can be created on purpose during the time the light emitter is active—every active and compensation channel signal should contain the interference pulse 205 at a known time. The absence of this interference pulse 205 at the known time is a sign of a signal chain failure. Such an artificial interference signal (311) can be created by capacitive coupling of a pulse signal, generated by the processing unit 308, into the reference node 310 shared by the analog front end blocks. In another embodiment, said artificial interference can be created by capacitive coupling of a pulse signal, generated by the processing unit 308, into the node 302 shared by the photosensitive elements. Alternatively, said artificial interference can be created by using resistive coupling of a pulse signal, generated by the processing unit 308, into the nodes shared by the photosensitive element and the analog front end blocks. Other capacitive, inductive, resistive ways of generating such an artificial interference signal and other signal shapes are, of course, possible. Said artificial interference signal can be also generated or triggered by another system which may be external to the described LIDAR system.

In addition to this, the statistics of the compensation channel can be used to automatically derive dynamic detection thresholds, significantly reducing the probability of false detection (critical) while adjusting for increased sensitivity when noise is not present.

Figure 4:
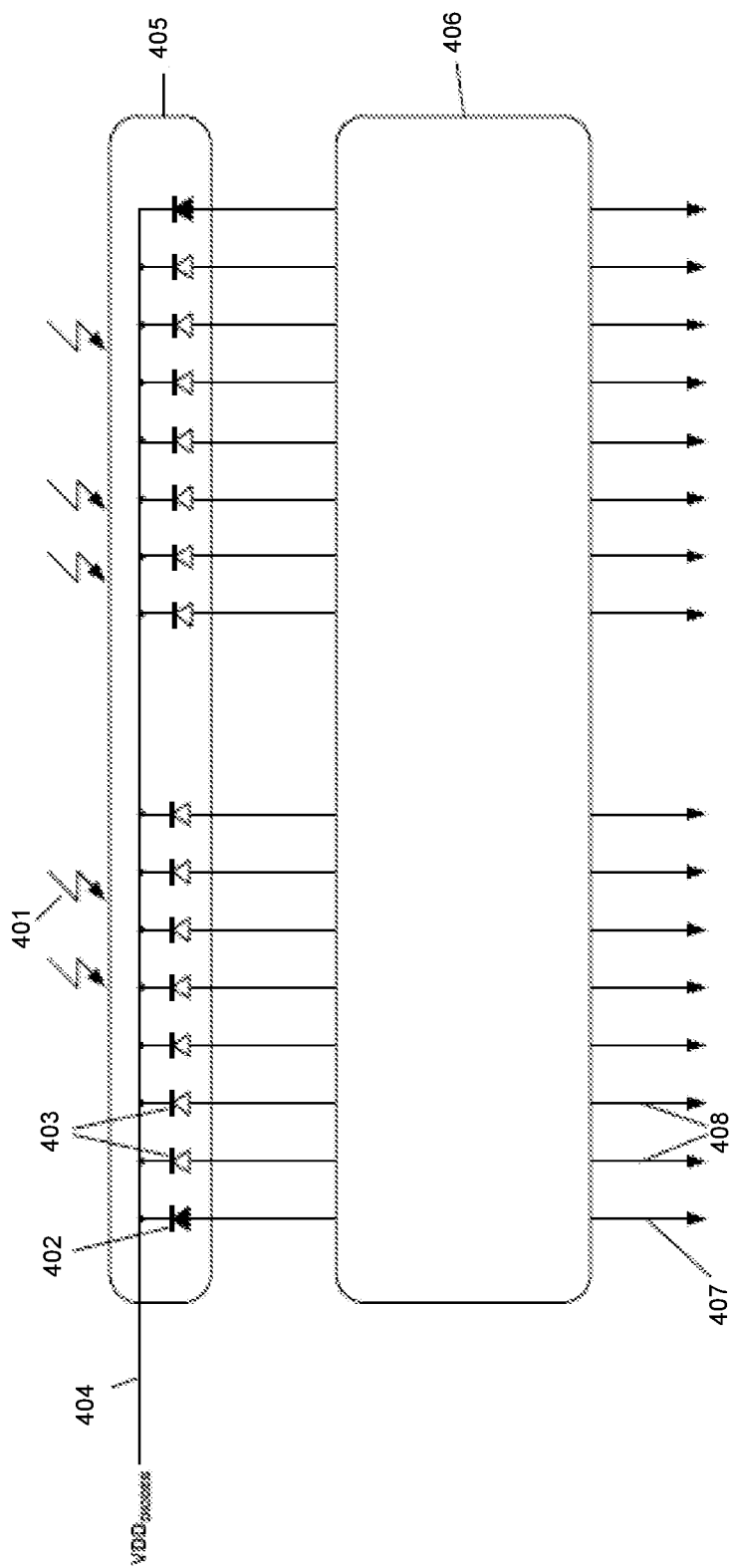
FIG. 4 illustrates the use of the proposed system for a functionality safety check.

An illustration is provided in FIG. 4. This figure shows a light transducer array to which a light stimulus 401 from the environment is applied. The array comprises a plurality of active elements 403 and at either end of the array a blinded photosensitive element is provided as part of a compensation channel. The active channels are formed by the photosensitive elements and their respective analog front-end circuit in analog signal chain 406. Equally, the compensation channel contains the blinded element and an analog front-end circuit in analog signal chain 406. A common power supply 404 to the array is shown as well. The signals output to the processing unit are shown as well, i.e. the active signals 408 and the signal 407 from the compensation channel. The latter signal 407 is also used for the functional safety health check.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A multi-channel light detection and ranging system comprising:
   a plurality of active channels, each comprising a photosensitive element arranged to be exposed to light and an analog front end circuit arranged for receiving a signal from said photosensitive element representative of the light, whereby at least one of said active channels is susceptible of being affected by crosstalk interference caused by inductive, resistive or capacitive coupling with at least one other active channel and/or by interference common to said analog front end circuits,
   at least one compensation channel also susceptible of being affected by said crosstalk interference caused by inductive, resistive or capacitive coupling with at least one active channel, said at least one compensation channel comprising a compensation element being substantially insensitive to light and an analog front end circuit arranged for receiving signals from said compensation element, said compensation element being electrically connected to a network shared by said photosensitive elements and to said analog front end circuit of said at least one compensation channel,
   a processing unit arranged for
      receiving signals from said active channels and said at least one compensation channel,
      deriving at least one compensation signal from said signal received from said at least one compensation channel, and
      compensating for said crosstalk interference and/or said interference common to said analog front end circuits of said active channels;
   wherein compensating for said crosstalk comprises one or more of:
      subtracting said at least one compensation signal from said signals received from said active channels,
      modifying said signal received from said photosensitive element, said modifying comprising at least a pulse shaping,
      performing a gradient compensation wherein a weighted sum of signals is determined whereby the position of two of said compensation channels is taken into account.

2. The multi-channel light detection and ranging system as in claim 1, wherein said compensation element is implemented as a blinded photodiode.

3. The multi-channel light detection and ranging system as in claim 1, wherein said compensation element is implemented as capacitor.

4. The multi-channel light detection and ranging system as in claim 1, wherein said compensating for said crosstalk comprises said subtracting said at least one compensation signal from said signals received from said active channels.

5. The multi-channel light detection and ranging system as in claim 1, wherein said compensating for said crosstalk comprises said modifying said signal received from said photosensitive element, said modifying comprising at least the pulse shaping.

6. The multi-channel light detection and ranging system as in claim 5, wherein said modifying comprises performing a scaling and/or applying said signal received from said photosensitive element to a filter.

7. The multi-channel light detection and ranging system as in claim 1, comprising at least two compensation channels.

8. The multi-channel light detection and ranging system as in claim 7, wherein said compensating comprises said performing the gradient compensation wherein the weighted sum of signals is determined whereby the position of the two of said compensation channels is taken into account.

9. The multi-channel light detection and ranging system as in claim 1, whereby said photosensitive elements in said plurality of active channels have a terminal in common.

10. The multi-channel light detection and ranging system as in claim 1, wherein said processing unit is on a same substrate as said photosensitive elements and said analog front end circuits of said plurality of said active channels.

11. The multi-channel light detection and ranging system as in claim 1, wherein said photosensitive elements of said plurality of channels are on a different substrate than said analog front end circuits and said processing unit.

12. The multi-channel light detection and ranging system as in claim 1, wherein said photosensitive elements of said active channels are on a different substrate than said compensation element of said at least one compensation channel.

13. The multi-channel light detection and ranging system as in claim 1, wherein said processing unit is arranged for detecting a signal chain failure by observing a signal obtained after crosstalk interference compensation.

14. The multi-channel light detection and ranging system as in claim 1, further arranged for generating at a given time an interference signal, common to said analog front end circuits, and whereby said processing unit is arranged for detecting a signal chain failure by observing at said given time a signal obtained after crosstalk interference compensation.

* * * * *